(12) United States Patent
Lin

(10) Patent No.: US 8,279,093 B2
(45) Date of Patent: Oct. 2, 2012

(54) APPARATUS FOR DETECTING BUS CONNECTION

(75) Inventor: Hsin Chih Lin, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 316 days.

(21) Appl. No.: 12/846,667

(22) Filed: Jul. 29, 2010

(65) Prior Publication Data

US 2012/0026018 A1 Feb. 2, 2012

(51) Int. Cl.
*H03K 17/94* (2006.01)

(52) U.S. Cl. ............... 341/26; 710/100; 710/305

(58) Field of Classification Search ............ 341/26; 710/100, 305
See application file for complete search history.

(56) References Cited

U.S. PATENT DOCUMENTS

| | | | | |
|---|---|---|---|---|
| 5,549,280 | A * | 8/1996 | Kings et al. | 266/78 |
| 5,613,074 | A * | 3/1997 | Galloway | 710/100 |
| 5,680,555 | A * | 10/1997 | Bodo et al. | 710/306 |
| 5,832,244 | A * | 11/1998 | Jolley et al. | 710/305 |
| 2008/0246879 | A1* | 10/2008 | Adachi | 348/553 |
| 2008/0250186 | A1* | 10/2008 | Suzuki et al. | 710/313 |
| 2009/0287445 | A1* | 11/2009 | Vayhinger | 702/100 |
| 2011/0072316 | A1* | 3/2011 | Chan et al. | 714/48 |

* cited by examiner

*Primary Examiner* — Patricia Nguyen

(57) ABSTRACT

An apparatus for detecting bus connection is provided for determining whether an electrical connector of a peripheral device is connected to an electrical connection port. In the apparatus, a detection capacitor is electrically coupled to a detection pin in the electrical connection port, and a controller is provided to transmit a detection signal to the detection pin. According to the signal fed back by the detection capacitor, the occurrences of the charge and discharge phenomena in the detection capacitor are determined, and then the controller is able to determine whether the detection pin of the electrical connector is electrically coupled to the electrical connector, so as to initiate a system event. The detection pin is not electrically charged when the detection pin is not electrically coupled to the electrical connector, so as to prevent the detection pin from being electrolyzed in the water or in a humid circumstance.

23 Claims, 9 Drawing Sheets

APPARATUS FOR DETECTING BUS CONNECTION

BACKGROUND OF THE INVENTION

1. Technical Field

The present invention relates to detection of bus connection, and more particularly to an apparatus for detecting bus connection with a detection pin which is not electrically charged during detection, so as to prevent the detection pin from being electrolyzed in water or in a humid circumstance.

2. Related Art

For an electrical connection port supporting Hot-Plug function, a detection mechanism is required in an electronic device to continuously detect whether an electrical connector of a peripheral device is connected to the electrical connection port, so that the electronic device begins to perform a procedure such as handshaking with the peripheral device through the electrical connection port and the electrical connector, thereby establishing a communication connection with the peripheral device.

Please refer to FIG. 1, a typical detection circuit in the prior art is applied in an electrical connection port having a detection pin 1. The detection circuit includes a voltage source 2, a depletion-type field effect transistor 3, and a voltage level detection unit 4. The voltage source 2 is serially connected to a gate of the depletion-type field effect transistor 3 through two resistors 5 and 6, and the detection pin 1 is electrically coupled to the conjunction node of the two resistors 5 and 6.

The voltage level detection unit 4 is also electrically coupled to a drain of the depletion-type field effect transistor 3 through a resistor 7, and a source of the depletion-type field effect transistor 3 is electrically grounded. The voltage source 2 continuously outputs a voltage to the gate, so that the loop between the source and the drain is normally opened, and thus the voltage level detection unit 4 can continuously detect a reference voltage level Vref. When an electrical connector of a peripheral device is connected to the electrical connection port, the detection pin 1 is electrically coupled to a circuit of the peripheral device, bypasses the output of the voltage source 2 to the circuit of the peripheral device, so that a voltage level of the gate of the depletion-type field effect transistor becomes zero, and the loop between the source and the drain turned to be normally closed, and bypasses the reference voltage level Vref to a ground line, so that the voltage level detection unit 4 obtains a voltage level of zero, thereby obtaining a state in which the electrical connector of the peripheral device has been connected to the electrical connection port.

For an electronic device that is usually soaked in water or operated in a humid circumstance, for example, a product conforming to the International Protection Code, seams of the housing thereof is subjected to water proofing. When the electronic device is operated in the water or in the humid circumstance, the waterproof housing hermetically wraps the electronic circuit of the electronic device to prevent moisture from entering the housing. Regarding to the buttons of the electronic device, watertight thin films are adhered to the inner surface or the outer surface of the housing of the electronic device for covering button holes formed on the housing, so as to prevent moisture from entering the housing through the button holes.

In an electronic device conforming to the International Protection Code, an electrical connection port is usually protected with a waterproof cover in an unused state; when the electrical connection port is connected to an electrical connector, the tight connection between the electrical connector and the electrical connection port ensures that moisture does not invade the conjunction area between the electrical connector and the electrical connection port.

However, in a part of waterproof electronic devices, electrical connection ports thereof need to be exposed normally and cannot be regularly protected with a waterproof cover. The detection pin 1 in FIG. 1 is maintained at a non-zero voltage level due to the voltage detection signal continuously output from the voltage source 2. When the electrical connection port is soaked in water or has moisture on the surface, an electrolysis phenomenon occurs to the detection pin 1 in the water since the detection pin 1 is electrically charged to a non-zero voltage level. The electrolysis phenomenon not only corrodes the detection pin 1, but also causes a short-circuit effect between pins in the electrical connection port 120, so that the voltage output from the voltage source 2 is fed back to other pins through the water, and thus a system error occurs in a circuit of the electronic device.

In practice, not every type of electrical connection port is equipped with the detection pin 1, for example, a USB electrical connection port. In the communication protocol of the USB electrical connection port, a peripheral device continuously exchanges messages with an electronic device through a signal transmission pin to detect whether the peripheral device maintains electrical connection with the USB electrical connection port. In the electrical connection port of this type, the signal transmission pin or a power supply pin needs to be continuously in the state in which the voltage level thereof is not equal to zero. Only after the electrical connector of the peripheral device is connected to the electrical connection port, the peripheral device can acquire a drive power and initiate a request message, so that the electronic device obtains a system event that the electrical connector has been connected to the electrical connection port. If the electrical connection port is exposed to water, the above pin will be rapidly corroded due to electrolysis. Therefore, for such electrical connection port, a mechanism capable of enabling or disabling the electrical connection port is required; otherwise, the electrical connection port must be completely prevented from contacting water.

SUMMARY

In the connection detection mechanism in the prior art, the detection pin is normally electrically charged to a non-zero voltage level, so that an electrolysis phenomenon occurs to the detection pin in humidity, thereby accelerating corrosion of the detection pin. In view of the above problem, the present invention is directed to an apparatus for detecting bus connection, which can avoid the problem of accelerated corrosion of the detection pin.

The present invention provides an apparatus for detecting bus connection, for detecting whether an electrical connector of a peripheral device is connected to an electrical connection port. The apparatus for detecting bus connection includes a controller, a voltage dropping resistor, a detection capacitor, a feedback wire, and a detection pin. The controller has a signal output pin and a signal feedback pin, and the controller initiates a detection signal from the signal output pin. The voltage dropping resistor and the detection capacitor are connected in series to each other, in which the voltage dropping resistor is electrically coupled to the signal output pin of the controller. The feedback wire has one end electrically coupled to a conjunction node of the voltage dropping resistor and the detection capacitor, and the other end of the feedback wire is electrically coupled to the signal feedback pin of the controller. The detection pin is disposed in the electrical connection port, and the detection capacitor is connected to the detection pin of the controller.

When the detection pin is not electrically coupled to the electrical connector, the detection signal passes through the voltage dropping resistor to form a first feedback signal, and is fed back to the signal feedback pin of the controller. When the detection pin is electrically coupled to the electrical connector, the detection capacitor is charged and discharged to form a second feedback signal, which is fed back to the signal feedback pin of the controller. Through the change of the first feedback signal and the second feedback signal, the controller determines whether the electrical connector is connected to the electrical connection port, so as to initiate a system event when the electrical connector is connected to the electrical connection port.

In the present invention, when the detection pin is used for detecting whether the electrical connector is connected to the electrical connection port, no voltage level is applied to the detection pin, so as to prevent an electrolysis phenomenon from occurring to the detection pin in humidity, which can effectively slow down the corrosion of the detection pin in a humid environment or water and prolong the service life of the electrical connection port.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
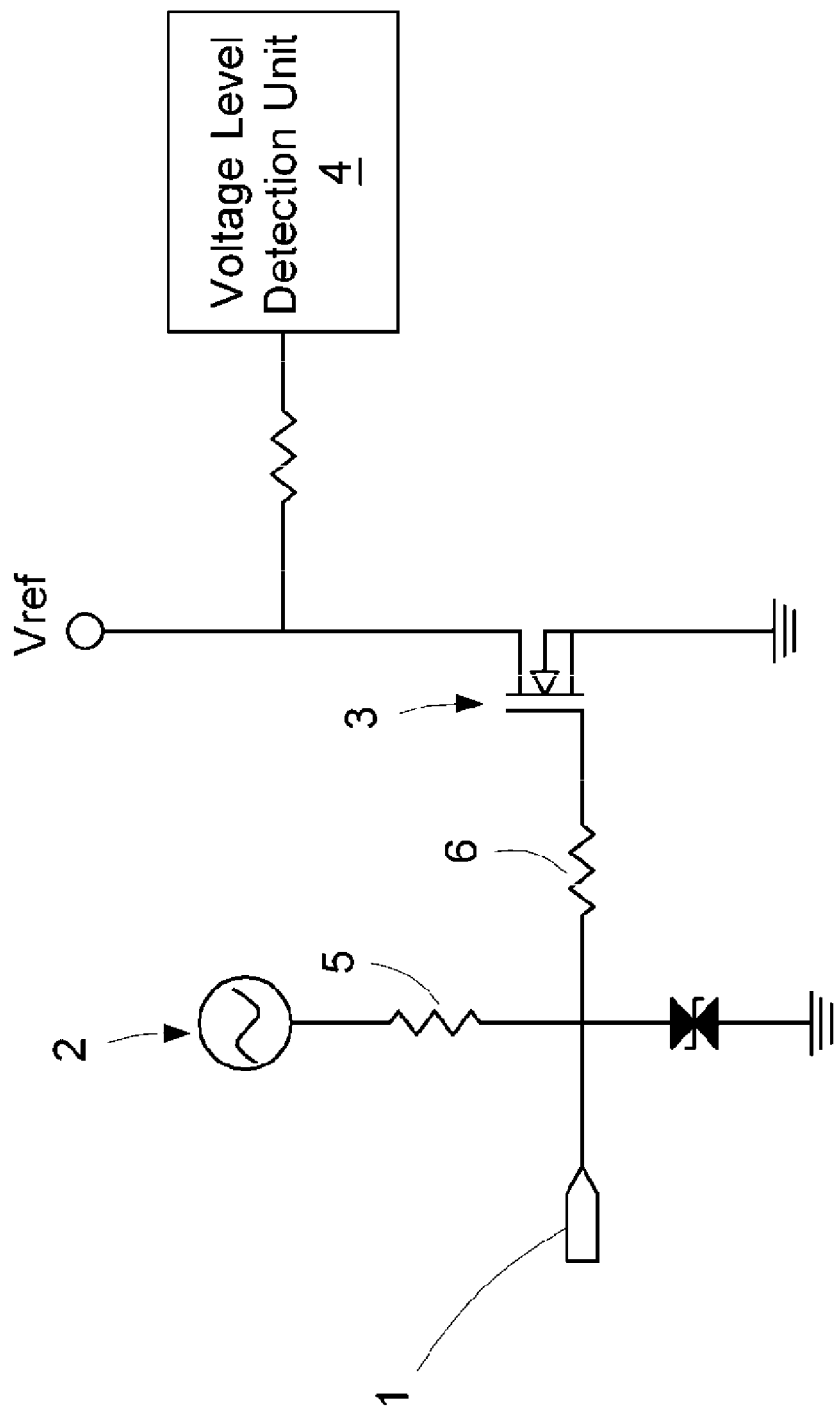
FIG. 1 is a circuit diagram of a detection circuit in the prior art.
Figure 2:
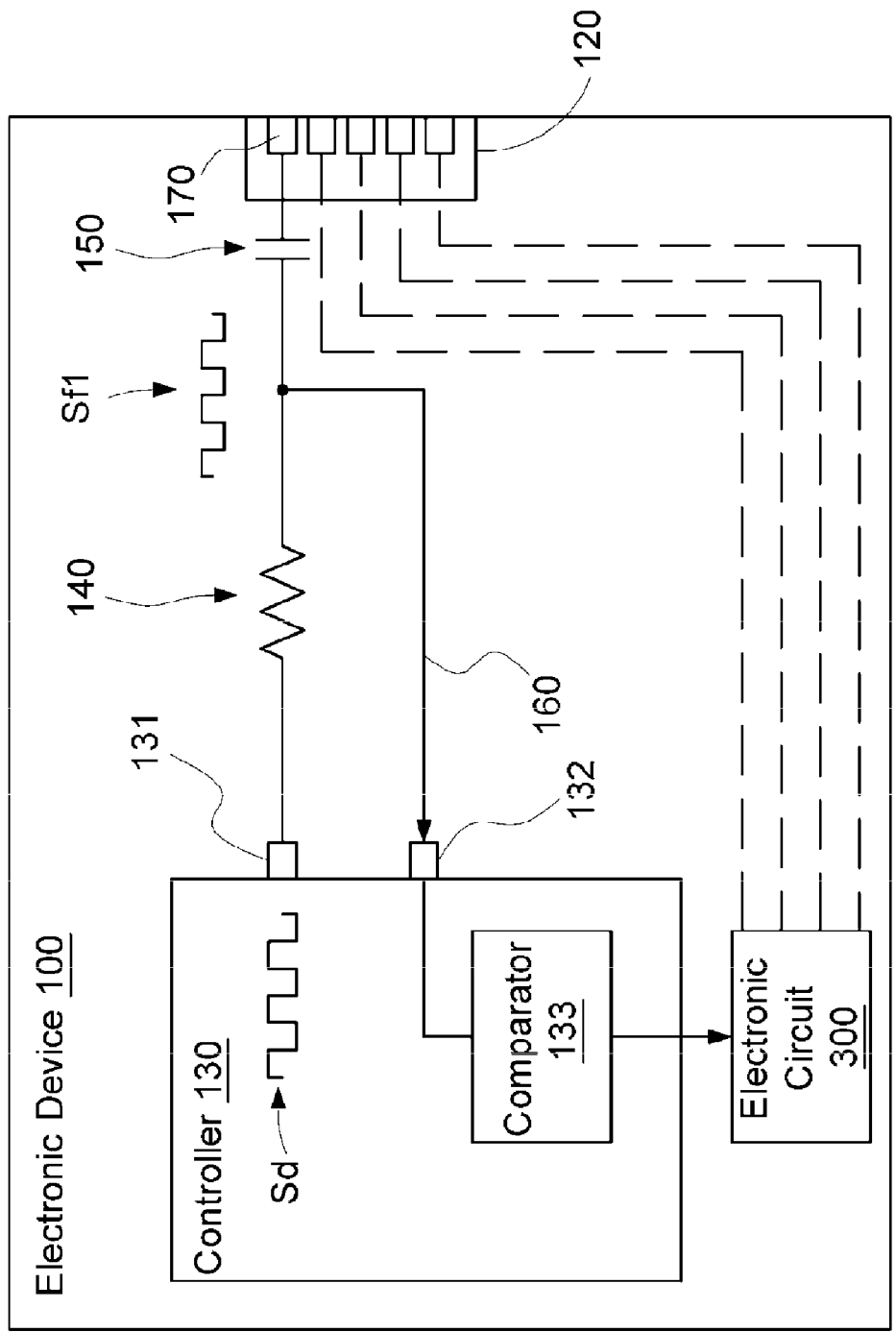
FIG. 2 is a circuit diagram of a first embodiment of the present invention, illustrating a state in which an electrical connector is not connected to an electrical connection port.

Please refer to FIG. 2, in which an apparatus for detecting bus connection according to a first embodiment of the present invention is illustrated. The apparatus for detecting bus connection is applied in an electronic device 100. The electronic device 100 comprises an electronic circuit 300. The apparatus for detecting bus connection is used for detecting whether an electrical connector 210 of a peripheral device 200 is connected to an electrical connection port 120 of the electronic device 100.

Please refer to FIG. 2, the apparatus for detecting bus connection includes a controller 130, a voltage dropping resistor 140, a detection capacitor 150, a feedback wire 160, and a detection pin 170.

Please refer to FIG. 2, the controller 130 includes a plurality of pins, and at least a signal output pin 131 and a signal feedback pin 132 are included in these pins. The controller 130 can be an embedded controller (EC) to serve as a keyboard controller (KBC) of the electronic circuit 300. By setting a program code of a KBC basic input/output system (KBC BIOS), the KBC can have additional functions to serve as the controller 130 in the first embodiment of the present invention. The signal output pin 131 and the signal feedback pin 132 of the controller 130 can respectively be a general purpose output pin (GPO pin) and a general purpose input pin (GPI pin). In addition, the EC can also be a micro-control unit (MCU) additionally disposed in the electronic device 100 and electrically coupled to the electronic circuit 300.

Please refer to FIG. 2, the voltage dropping resistor 140 and the detection capacitor 150 are connected in series to each other. One end of the detection capacitor 150 is electrically coupled to the voltage dropping resistor 140, and the other end of the detection capacitor 150 is electrically coupled to the detection pin 170. Therefore, the voltage dropping resistor 140, the detection capacitor 150, and the detection pin 170 are serially connected to the signal output pin 131 in sequence. One end of the feedback wire 160 is electrically coupled to a conjunction node where the voltage dropping resistor 140 and the detection capacitor 150 are connected to each other, and the other end of the feedback wire 160 is electrically coupled to the signal feedback pin 132 of the controller 130.

Please refer to FIG. 2, the detection pin 170 is disposed in the electrical connection port 120, and is one of pins in the electrical connection port 120. And the detection pin 170 is electrically coupled to the other end of the detection capacitor 150, so that the detection pin 170 is electrically coupled to the voltage dropping resistor 140 indirectly through the detection capacitor 150. Part of the detection pin 170 may be exposed on a surface of a housing of the electronic device 100 along with the electrical connection port 120. The pre-defined function of the detection pin 170 in the electrical connection port 120 varies with the specification standard employed by the electrical connection port 120. Usually, the detection pin 170 is most preferably a pin not for transmitting data, so as to reduce the complexity of circuit design. In a preferred embodiment of the present invention, the detection pin 170 is a detection pin defined in the original specification standard of the electrical connection port 120.

Figure 3:
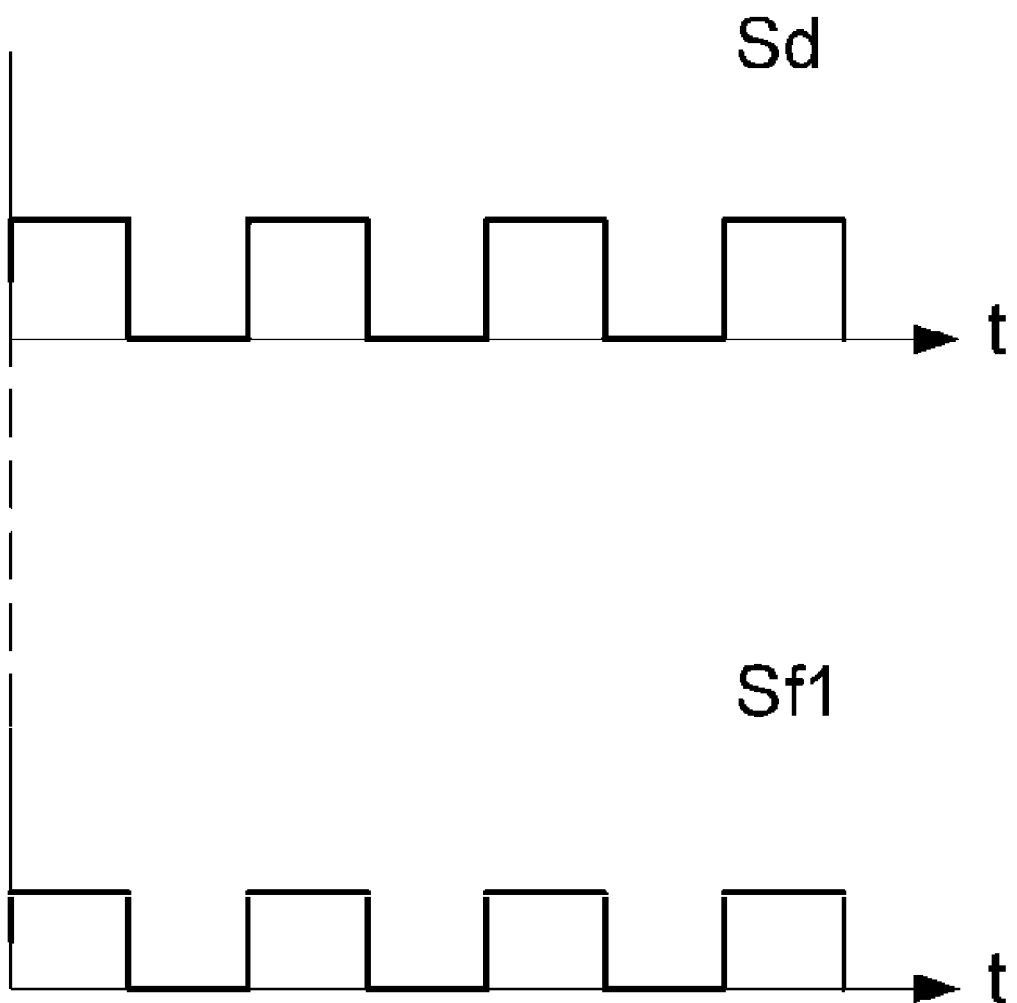
FIG. 3 is a schematic view of a detection signal and a first feedback signal in FIG. 2.

Please refer to FIGS. 2 and 3, the controller 130 normally initiates a detection signal Sd through the signal output pin 131. The detection signal Sd forms a first feedback signal Sf1 after passing through the voltage dropping resistor 140. The first feedback signal Sf1 is then fed back to the signal feedback pin 132 of the controller 130 through the feedback wire 160. When the electrical connector 210 of the peripheral device 200 is not electrically coupled to the electrical connection port 120, the detection pin 170 can not conduct electric current from the detection capacitor 150 to an external subject such as the electrical connector 210, so that the two ends of the detection capacitor 150 are in an opened circuit state.

Please refer to FIGS. 2 and 3, since the two ends of the detection capacitor 150 form an opened circuit, the detection signal Sd of the signal output pin 131 does not charge the detection capacitor 150. The detection signal Sd directly forms the first feedback signal Sf1 after passing through the voltage dropping resistor 140, and the first feedback signal Sf1 is fed back to the signal feedback pin 132. A waveform of the first feedback signal Sf1 is approximately the same as that of the detection signal Sd, and merely the voltage level is changed, that is, after the detection signal Sd passes through the voltage dropping resistor 140, a voltage drop is produced due to the voltage dropping resistor 140, and a first feedback signal Sf1 at a low voltage level is formed.

The detection signal Sd is a continuous pulse signal, and has a fixed duty to cycle ratio, and the continuous pulse signal is most preferably a PWM of a square wave. As described above, when the detection pin 170 is not electrically coupled to the electrical connector 210, the two ends of the detection capacitor 150 form an opened circuit, and the detection signal Sd directly forms the first feedback signal Sf1 after passing through the voltage dropping resistor 140. Herein, the waveform of the first feedback signal Sf1 is also a continuous pulse signal; and if the detection signal Sd is a square wave, the first feedback signal Sf1 will be a square wave having the same signal cycle and duty to cycle ratio, and the detection signal Sd and the first feedback signal Sf1 have no phase difference. The only difference lies in that, a maximum voltage and an average voltage level of the first feedback signal Sf1 drop due to the voltage drop produced by the voltage dropping resistor 140.

In the above state, the detection signal Sd does not pass through the detection capacitor 150 and is not conducted to the detection pin 170, and thus a non-zero voltage level is not generated on the detection pin 170. When the detection pin 170 is soaked in water or wet due to splash of water along with the electrical connection port 120, no electrolysis phenomenon occurs to the detection pin 170 in water, so as to avoid accelerated corrosion of the detection pin 170. In addition, the electronic circuit 300 may also temporarily disable the electrical connection port 120, including power supply and handshaking message transmission, so as to avoid non-zero voltage level on other pins in the electrical connection port 120.

Figure 4:
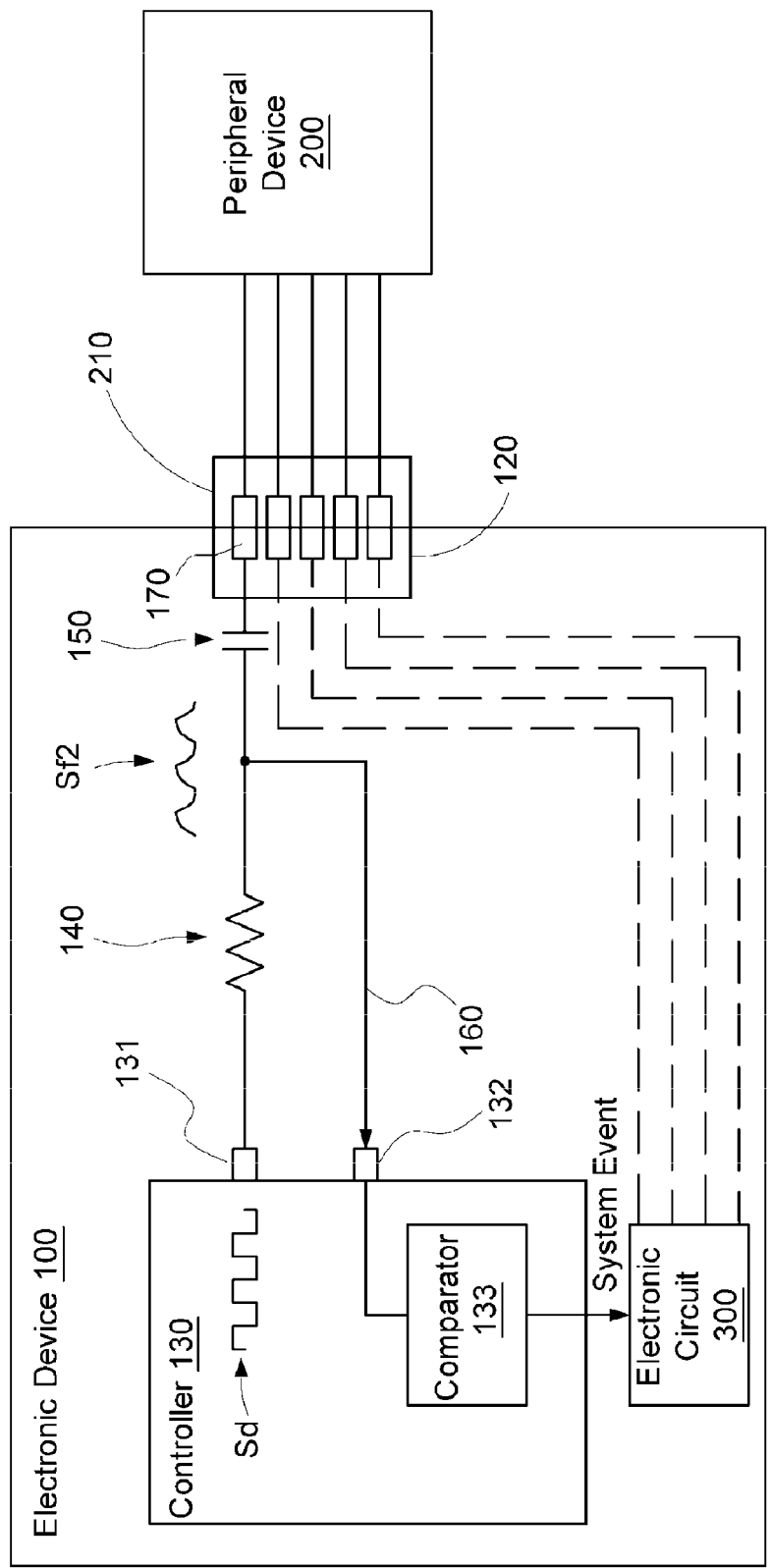
FIG. 4 is a circuit diagram of the first embodiment of the present invention, illustrating a state in which the electrical connector is connected to the electrical connection port.
Figure 5:
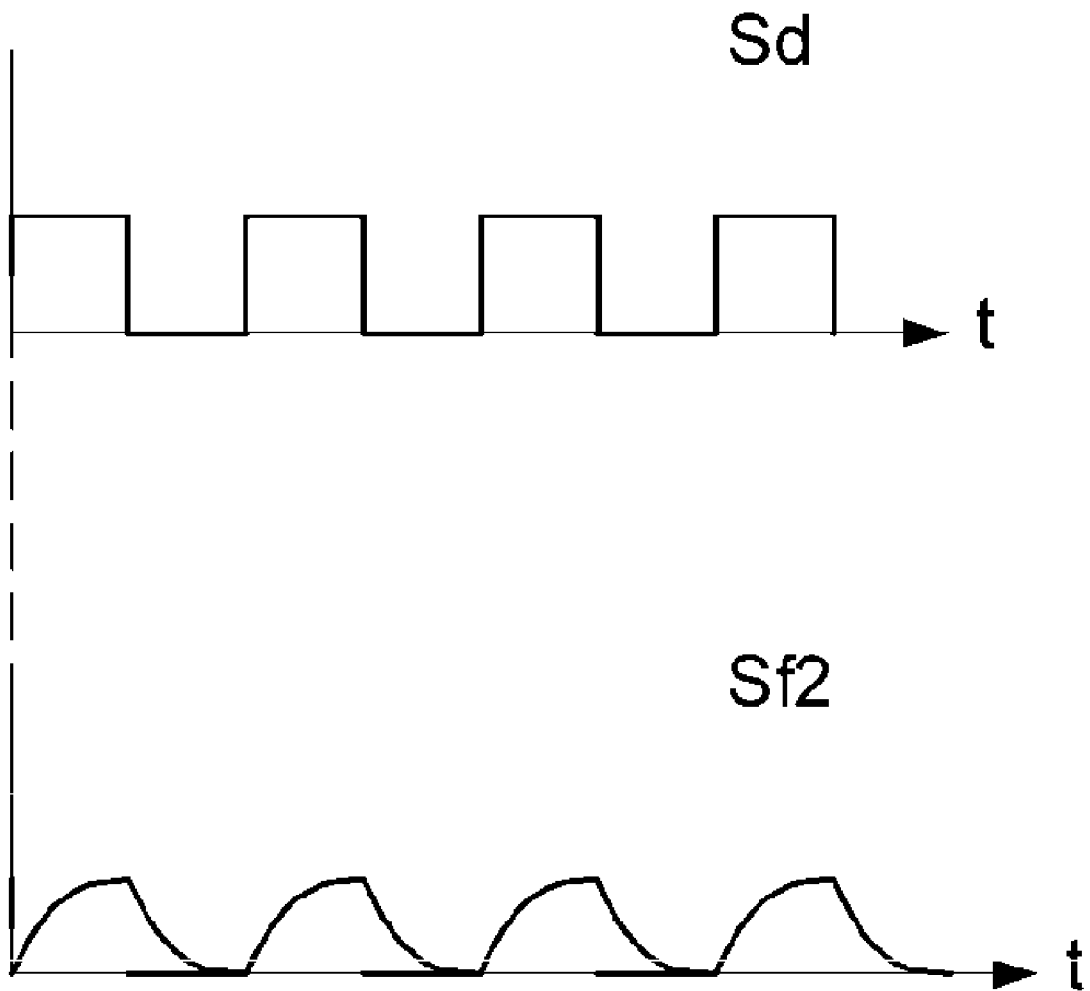
FIG. 5 is a schematic view of a detection signal and a second feedback signal in FIG. 4.

Please refer to FIGS. 4 and 5, when the electrical connector 210 of the peripheral device 200 is connected to the electrical connection port 120, the detection pin 170 is electrically coupled to the electrical connector 210, so that the detection pin 170 is electrically coupled to a circuit of the peripheral device 200. At this time, the detection pin 170 and the circuit of the peripheral device 200 cause the two ends of the detection capacitor 150 to form a closed circuit. Thus, the detection signal Sd passing through the voltage dropping resistor 140 has a charging effect on the detection capacitor 150, so that the detection capacitor 150 is charged and discharged to produce a second feedback signal Sf2 of a charge/discharge waveform and feed back the signal to the signal feedback pin 132 of the controller 130.

The controller 130 continuously outputs the detection signal Sd through the signal output pin 131, and continuously detects a voltage level change of the signal feedback pin 132. According to the waveform change, the controller 130 determines whether the signal feedback pin 132 receives the first feedback signal Sf1 or the second feedback signal Sf2. When the signal feedback pin 132 receives the second feedback signal Sf2, the controller 130 initiates a system event and notifies it to the electronic circuit 300. Upon notified by the system event, the electronic circuit 300 learns the event that the electrical connector 210 of the peripheral device 200 has been connected to the electrical connection port 120. At this time, the electronic circuit 300 may enable the power supply and signal transmission functions of the electrical connection port 120, and begin to perform a procedure such as handshaking so as to establish a communication connection between the electronic device 100 and the peripheral device 200.

The first feedback signal Sf1 and the second feedback signal Sf2 can be compared in different ways to determine their difference. For example, when the controller 130 has high computational capability, the controller 130 directly stores the waveforms of the first feedback signal Sf1 and the second feedback signal Sf2, and compares the waveform of the signal received by the signal feedback pin 132 with the waveforms of the first feedback signal Sf1 and the second feedback signal Sf2. However, generally speaking, if the controller 130 is a KBC or an MCU, the controller 130 has relatively low computational capability, and thus cannot compare the waveforms. At this time, comparison can also be made based on the voltage level change of the signal feedback pin 132.

Please refer to FIGS. 2, 4, and 5, in the mechanism for comparison based on the voltage level change of the signal feedback pin 132, the controller 130 has a comparator 133 and a threshold voltage level Vth for the voltage level change of the signal feedback pin 132 is set in the controller 130. The threshold voltage level Vth is between a high level and a low level of the voltage level of the signal feedback pin 132.

The controller 130 detects the voltage level change of the signal feedback pin 132, and compares the voltage level change of the signal feedback pin 132 with the threshold voltage level Vth through the comparator 133. Further, the controller 130 performs a voltage level comparison with the comparator 133 when the output of the detection signal Sd is a duty portion of a signal cycle.

When the output of the detection signal Sd is a duty portion of a signal cycle, and a comparison result of the controller 130 is that a duration in which the voltage level of the signal feedback pin 132 is continuously lower than the threshold voltage level Vth exceeds a threshold time Tth, the controller 130 determines that the detection capacitor 150 is charged/discharged. At this time, the controller 130 determines that the signal received by the signal feedback pin 132 is the second feedback signal Sf2, and initiates a system event to notify the electronic circuit 300. Upon notified by the system event, the electronic circuit 300 learns the event that the electrical connector 210 of the peripheral device 200 has been connected to the electrical connection port 120.

On the contrary, when the output of the detection signal Sd is a duty portion of a signal cycle, and a comparison result of the controller 130 is that when the voltage level of the signal feedback pin 132 is continuously higher than the threshold voltage level Vth, or a duration in which the voltage level of the signal feedback pin 132 is continuously lower than the threshold voltage level Vth does not exceed the threshold time Tth, the controller 130 determines that the detection capacitor 150 is not charged/discharged. At this time, the controller 130 determines that the signal received by the signal feedback pin 132 is the first feedback signal Sf1. The unavoidable equivalent inductance in the overall circuit may cause a slight phase difference between the detection signal Sd and the first feedback signal Sf1. Therefore, the threshold time Tth is set to avoid misjudgment caused by the phase difference.

Figure 6:
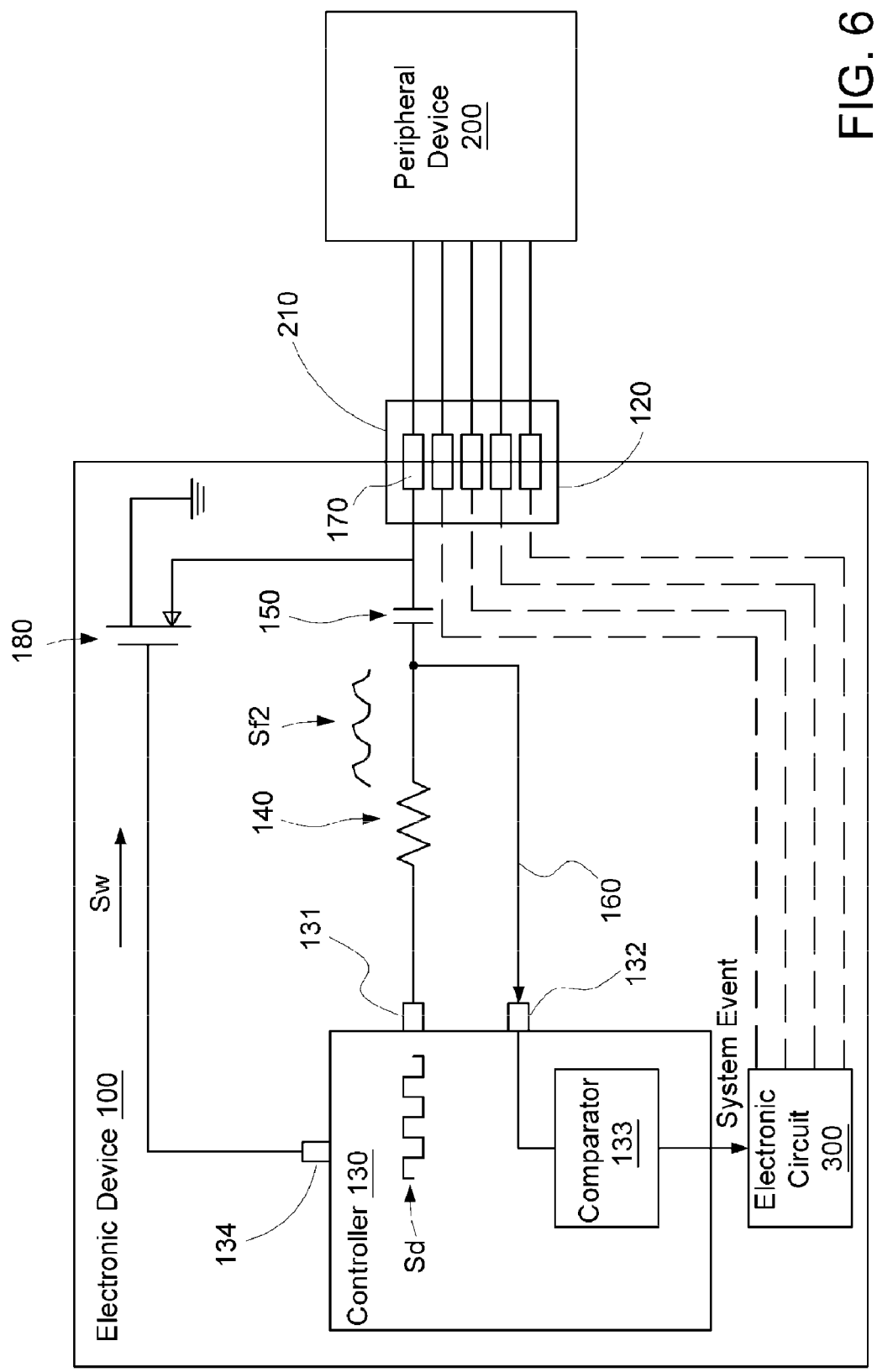
FIG. 6 is a circuit diagram of a second embodiment of the present invention, illustrating a state in which the electrical connector is connected to the electrical connection port.

FIG. 6 is a circuit diagram of an apparatus for detecting bus connection in a second embodiment of the present invention. Generally, the functions of pins of the electrical connection port 120 all have been defined, and the electrical connection port 120 of the original specification does not necessarily have a pin with detection function, but the electrical connection port 120 usually has a pin for grounding. In order to reduce conflict between the detection pin 170 and the predefined signal transmission function of the electrical connection port 120, the detection pin 170 can be the pin for grounding in the electrical connection port 120.

As shown in FIG. 6, the apparatus for detecting bus connection in the second embodiment is similar to that in the first embodiment. The difference between the second embodiment and the first embodiment lies in that, the detection pin 170 is used for electrically grounding the electrical connection port 120, that is, in practice, the detection pin 170 serves as a ground pin of the electrical connection port 120 at the same time. Therefore, the apparatus for detecting bus connection in the second embodiment further includes a switch 180. One end of the switch 180 is electrically coupled to the detection pin 170, and the other end of the switch 180 is electrically grounded, so as to ground or not to ground the detection pin 170 through switching of the switch 180. The controller 130 further includes a control pin 134 electrically coupled to the switch 180. When the controller 130 receives the second feedback signal Sf2 through the signal feedback pin 132 and determines that the electrical connector 210 of the peripheral device 200 is electrically coupled to the electrical connection port 120, the controller 130 transmits a switching signal Sw to the switch 180 at the same time, so as to turn the switch 180 to connect the detection pin 170 to a ground circuit and then ground the detection pin 170. The circuit of the peripheral device 200 also achieves electrical grounding through the detection pin 170. When the controller 130 notifies that the peripheral device 200 has been offline through the electronic circuit 300, the controller 130 stops outputting the switching signal Sw. Therefore, the switch 180 returns to be broken circuit, and thus the detection pin 170 stops grounding and returns to the detection state.

Figure 7:
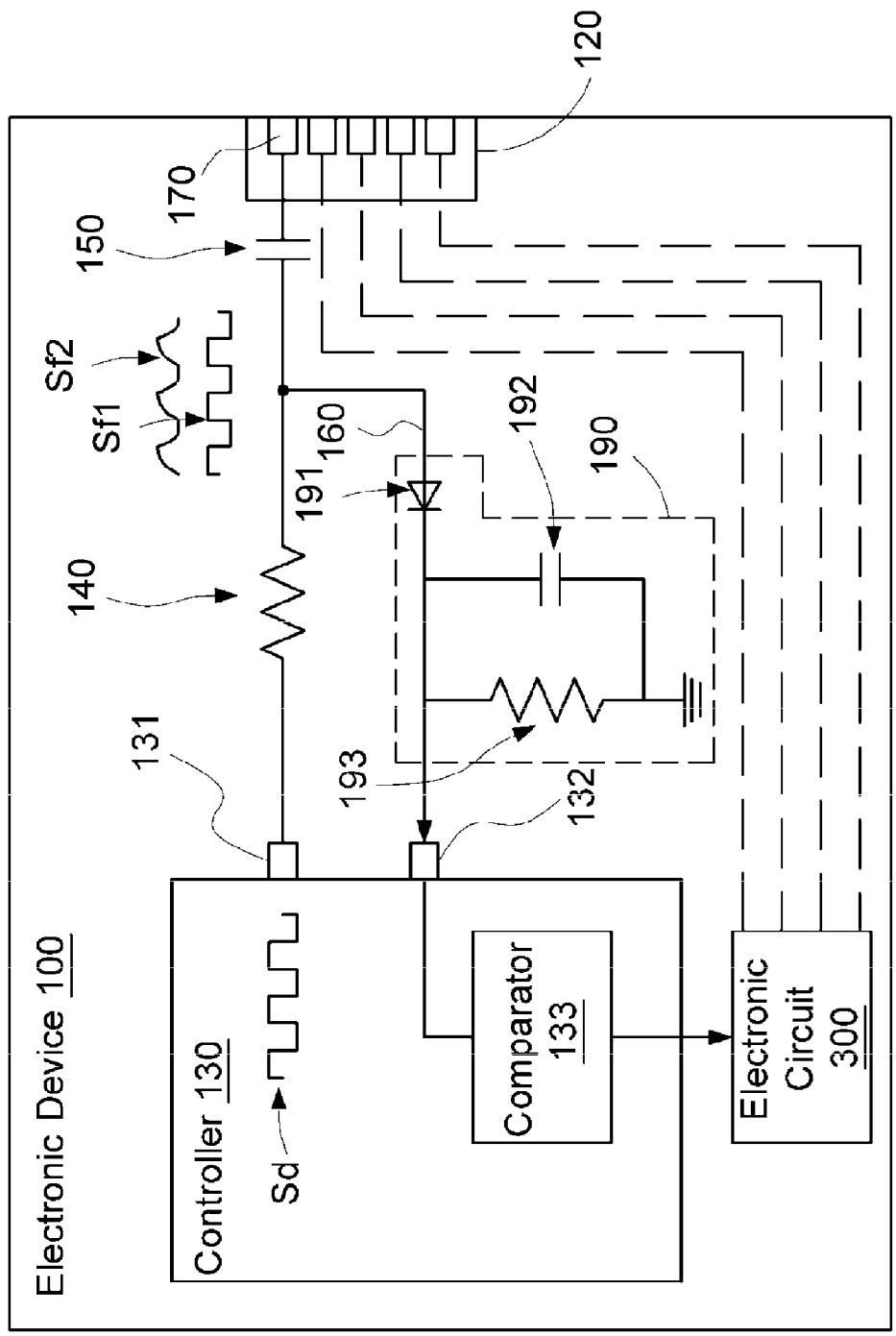
FIG. 7 is a circuit diagram of a third embodiment of the present invention, illustrating a state in which the electrical connector is not connected to the electrical connection port.

FIG. 7 is a circuit diagram of an apparatus for detecting bus connection in a third embodiment of the present invention. The apparatus for detecting bus connection is similar to that in the first embodiment, and includes a controller 130, a voltage dropping resistor 140, a detection capacitor 150, a feedback wire 160, and a detection pin 170. The connection relation between the elements is similar to that in the first embodiment, as mentioned above. The apparatus for detecting bus connection in the third embodiment further comprises a filter circuit 190 electrically coupled to the feedback wire 160. The filter circuit 190 includes a diode 191, a ground capacitor 192, and a ground resistor 193.

The diode 191 disposed in the feedback wire has an anode and a cathode. The anode of the diode 191 is connected in series to the voltage dropping resistor 140 through the feedback wire 160, and the cathode of the diode 191 is electrically coupled to a signal feedback pin 132 of the controller 130. If the diode 191 is a P-N junction diode 191, the anode is the P-type side, and the cathode is the N-type side. The diode 191 is used for preventing feedback of a signal produced by the filter circuit 190 to the detection capacitor 150.

The ground capacitor 192 and the ground resistor 193 are connected in parallel to each other. One conjunction node of the ground capacitor 192 and the ground resistor 193 is electrically coupled to the cathode of the diode 191, and the other conjunction node of the ground capacitor 192 and the ground resistor 193 is electrically grounded, so that the feedback wire 160 is electrically grounded through the diode 191, the ground capacitor 192, and the ground resistor 193. The ground capacitor 192 most preferably has a large capacitive reactance value, so as to be slowly charged and discharged.

Figure 8:
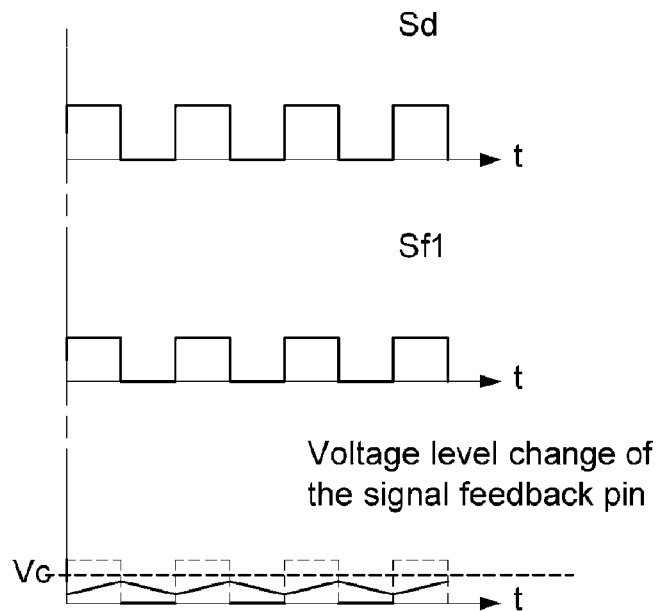
FIG. 8 is a schematic view of a detection signal and a first feedback signal in the third embodiment.

Please refer to FIGS. 7 and 8, when the electrical connection port 120 has no electrical connector 210 thereon, the two ends of the detection capacitor 150 are in an opened circuit state; a detection signal Sd initiated by a signal output pin 131 of the controller 130 forms a first feedback signal Sf1 after passing through the voltage dropping resistor 140, and the first feedback signal Sf1 is transmitted to the filter circuit 190. Since a waveform of the first feedback signal Sf1 is the same as that of the detection signal Sd, the first feedback signal Sf1 is also a square wave when the detection signal Sd is a square wave.

The above contents illustrate that the first feedback signal Sf1 includes a duty portion at a high level and a non-duty portion with a zero voltage level. Herein, most preferably, a product of a detection resistor Rd and the ground capacitor 192 is far greater than a cycle t of a duty portion of the detection signal Sd. At this time, the first feedback signal Sf1 after the duty cycle, due to the slow charging and discharging of the ground capacitor 192, causes the signal received by the signal feedback pin 132 of the controller 130 to be a triangular wave, and have a form approaching direct current.

Figure 9:
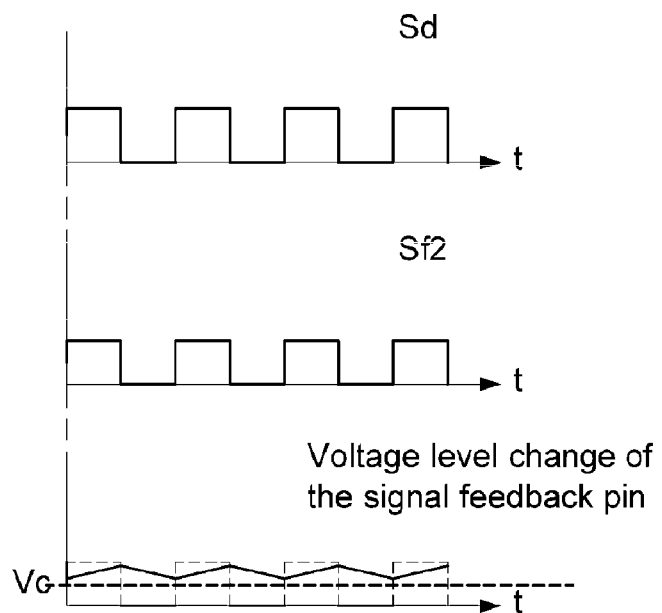
FIG. 9 is a schematic view of a detection signal and a second feedback signal in the third embodiment.

Please refer to FIGS. 7 and 9, when the electrical connector 210 is connected to the electrical connection port 120, the two ends of the detection capacitor 150 form a closed circuit; the detection signal Sd initiated by the signal output pin 131 of the controller 130 forms a second feedback signal Sf2 after passing through the voltage dropping resistor 140, and the second feedback signal Sf2 is transmitted to the filter circuit 190. The second feedback signal Sf2 at this time has an obvious change in charge/discharge cycle, and such a second feedback signal Sf2 also causes slow charging and discharging of the ground capacitor 192, so that the signal received by the signal feedback pin 132 of the controller 130 has a form approaching direct current.

The difference between the first feedback signal Sf1 and the second feedback signal Sf2 after passing through the filter circuit 190 lies in that, an average voltage level of the first feedback signal Sf1 after passing through the filter circuit 190 is relatively higher than that of the second feedback signal Sf2 after passing through the filter circuit 190. To this point, a comparison voltage Vc can be set in the controller 130. The average voltage level of the first feedback signal Sf1 after passing through the filter circuit 190 is smaller than the comparison voltage Vc, and the average voltage of the second feedback signal Sf2 after passing through the filter circuit 190 is greater than the comparison voltage Vc. After comparing a voltage level change of the signal feedback pin 132 with the comparison voltage Vc, the controller 130 determines whether the first feedback signal Sf1 or the second feedback signal Sf2 is received, so as to determine whether the electrical connection port of the peripheral device 200 is electrically coupled to the electrical connection port 120.

Figure 10:
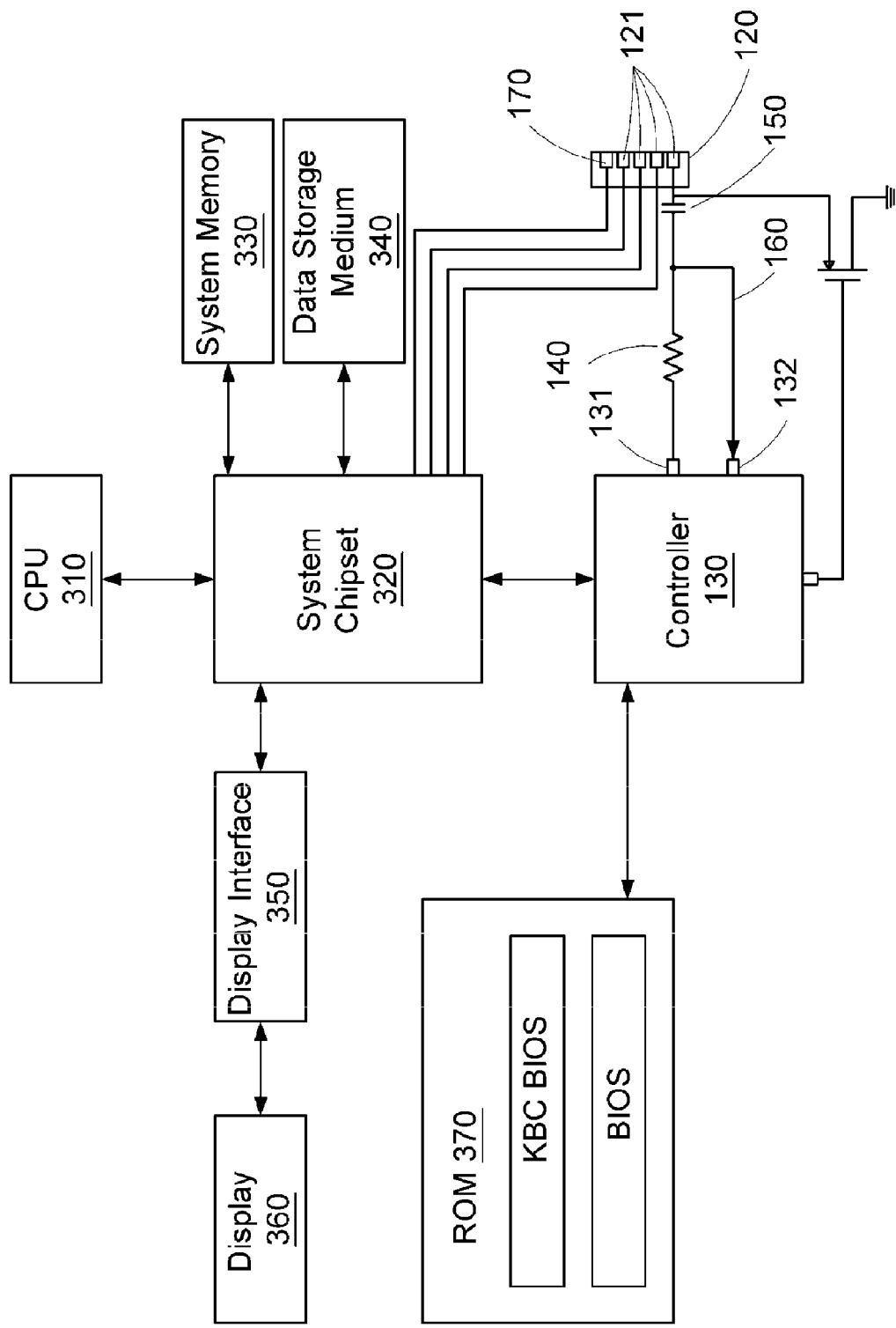
FIG. 10 is a circuit diagram of a fourth embodiment of the present invention.

FIG. 10 is a circuit diagram of an electronic device provided in a fourth embodiment of the present invention. As described above, the electronic device in the present invention can be a portable computer such as a laptop computer or an embedded electronic device such as a mobile phone, and basically includes an electronic circuit, an electrical connection port 120, and an apparatus for detecting bus connection provided in the first to third embodiments of the present invention.

The electronic circuit includes a central processing unit (CPU) 310, a system chipset 320, a system memory 330, a data storage medium 340, a display interface 350, a display 360, and a read only memory (ROM) 370. Herein, the system chipset 320 includes a north bridge chip and a south bridge chip respectively responsible for connection of different data buses. This application example simplifies the north bridge chip and the south bridge chip to a single system chipset 320 for illustration. The CPU 310, the system memory 330, the data storage medium 340, the display interface 350, and a controller 130 are all electrically coupled to the system chipset 320.

Please refer to FIG. 10, in various embodiments of the present invention, the controller 130 can be an EC or a KBC. Through firmware setting, the controller 130 additionally has the function of detecting a connection state of the electrical connection port 120. In addition, as a KBC of the electronic device, the controller 130 is electrically coupled to the ROM 370. When the electronic device is enabled, the controller 130 initializes various peripheral hardware, and the CPU 310 reads a basic input/output system (BIOS) and a KBC BIOS in the ROM 370 through the system chipset 320 and the controller 130 to initiate an operating system, a driver, and an application in the data storage medium 340 so as to operate the electronic device.

Please refer to FIG. 10, the electrical connection port 120 has a plurality of signal pins 121, and a detection pin 170 is disposed in the electrical connection port 120. The detection pin 170 can be one of the signal pins 121 of the electrical connection port 120, while other pins of the electrical connection port 120 are electrically coupled to the south bridge chip of the system chipset 320. In a minority of standard specifications of the electrical connection port, for example, in a P/S 2 connection port, other signal pins 121 of the electrical connection port 120 are electrically coupled to the controller 130 serving as the KBC. One end of the detection pin 170 is electrically coupled to a detection capacitor 150, so that the detection pin 170 is electrically coupled to a voltage dropping resistor 140 indirectly through the detection capacitor 150.

In the first to third embodiments, the controller 130 normally initiates a detection signal Sd from a signal output pin 131, the detection signal Sd forms a first feedback signal Sf1 or a second feedback signal Sf2 based on the connection state of the electrical connection port 120 after passing through the voltage dropping resistor 140, and the first feedback signal Sf1 or the second feedback signal Sf2 is then fed back to a signal feedback pin 132 of the controller 130 through a feedback wire 160.

When an electrical connector 210 of a peripheral device 200 is not electrically coupled to the electrical connection port 120, the detection signal Sd forms the first feedback signal Sf1 after passing through the voltage dropping resistor 140. When the electrical connector 210 of the peripheral device 200 is electrically coupled to the electrical connection port 120, the detection signal Sd forms the second feedback signal Sf1 after passing through the voltage dropping resistor 140. Therefore, the controller 130 determines whether the electrical connector 210 of the peripheral device 200 is connected to the electrical connection port 120 by determining whether the signal feedback pin 132 receives the first feedback signal Sf1 or the second feedback signal Sf2, and initiates a system event to the system chipset 320 when the electrical connector 210 is connected to the electrical connection port 120, so that the CPU 310 learns that the electrical connector 210 has been connected to the electrical connection port 120, and begins to perform a necessary procedure of establishing a communication connection.

In the first and third embodiments, the detection signal Sd output by the controller 130 through the signal output pin 131 is in the form of a square wave. However, the detection signal in the present invention is not limited to the square wave, and can also be a triangular wave or a sine wave. The detection mechanism of the present invention is mainly to determine whether the detection pin 170 is electrically coupled to the peripheral device 200 through a waveform change of a signal fed back to the signal feedback pin 132 by determining whether charging and discharging phenomena occur to the detection capacitor 150. Therefore, the signal fed back to the signal feedback pin 132 only needs to obviously differentiate the first feedback signal Sf1 and the second feedback signal Sf2 for determination of the controller 130, and the detection signal Sd is not limited to a specific form.

In the apparatus for detecting bus connection provided in the present invention, no voltage level is applied to the detection pin 170 in the detection state, and thus electrolysis of the detection pin 170 in the water is avoided. Therefore, in the apparatus for detecting bus connection of the present invention, the applied electrical connection port 120 can be exposed to water without causing the electrolysis phenomenon that accelerates corrosion.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An apparatus for detecting whether an electrical connector of a peripheral device is connected to an electrical connection port, the apparatus comprising:
    a controller, including a signal output pin for initiating a detection signal and a signal feedback pin;
    a voltage dropping resistor and a detection capacitor, in which one end of the detection capacitor is electrically coupled to the voltage dropping resistor, and the voltage dropping resistor is electrically coupled to the signal output pin of the controller;
    a feedback wire, having one end electrically coupled to a conjunction node of the voltage dropping resistor and the detection capacitor and the other end electrically coupled to the signal feedback pin of the controller; and
    a detection pin, disposed in the electrical connection port and electrically coupled to the other end of the detection capacitor; wherein the apparatus is arranged such that when the detection pin is not electrically coupled to the electrical connector, the detection signal passes through the voltage dropping resistor to form a first feedback signal fed back to the signal feedback pin of the controller, and when the detection pin is electrically coupled to the electrical connector, the detection capacitor is charged and discharged to form a second feedback signal fed back to the signal feedback pin of the controller.

2. The apparatus as claimed in claim 1, wherein the controller is an embedded controller.

3. The apparatus as claimed in claim 2, wherein the embedded controller is a keyboard controller or a micro-control unit.

4. The apparatus as claimed in claim 1, wherein the detection signal and the first feedback signal are both continuous pulse signals, and the detection signal and the first feedback signal have the same signal cycle and duty to cycle ratio.

5. The apparatus as claimed in claim 1, wherein:
    the controller stores the waveforms of the first feedback signal and the second feedback signal; and
    the controller compares the waveform of a signal received by the signal feedback pin with the waveforms of the first feedback signal and the second feedback signal, so as to determine whether the signal feedback pin receives the first feedback signal or the second feedback signal.

6. The apparatus as claimed in claim 1, wherein:
    a threshold voltage level and a threshold time is set in the controller, and the controller detects a voltage level change of the signal feedback pin;

when a duration in which a voltage level of the signal feedback pin is continuously lower than the threshold voltage level exceeds the threshold time, the controller determines that a signal received by the signal feedback pin is the second feedback signal; and when the voltage level of the signal feedback pin is continuously higher than the threshold voltage level, the controller determines that the signal received by the signal feedback pin is the first feedback signal; or when a duration in which the voltage level of the signal feedback pin is continuously lower than the threshold voltage level does not exceed the threshold time, the controller determines that the signal received by the signal feedback pin is the first feedback signal.

7. The apparatus as claimed in claim 6, wherein the controller includes a comparator for comparing the voltage level of the signal feedback pin with the threshold voltage level.

8. The apparatus as claimed in claim 6, wherein the detection signal is a continuous pulse signal, and the controller performs a voltage level comparison when an output of the detection signal is a duty portion of a signal cycle.

9. The apparatus as claimed in claim 1, wherein the controller initiates a system event when receiving the second feedback signal.

10. The apparatus as claimed in claim 1, further comprising a switch having one end electrically coupled to the detection pin and the other end electrically grounded, wherein the controller transmits a switching signal to turn the switch to electrically ground the detection pin when receiving the second feedback signal.

11. The apparatus as claimed in claim 1, further comprising a filter circuit electrically coupled to the feedback wire, wherein the filter circuit comprises:
  a diode, having an anode connected in series to the voltage dropping resistor through the feedback wire and a cathode electrically coupled to the signal feedback pin of the controller; and
  a ground capacitor and a ground resistor, connected in parallel to each other, wherein one conjunction node of the ground capacitor and the ground resistor is electrically coupled to the cathode of the diode, and the other conjunction node of the ground capacitor and the ground resistor is electrically grounded.

12. The apparatus as claimed in claim 11, wherein a comparison voltage is set in the controller, and the controller determines whether the first feedback signal or the second feedback signal is received by comparing a voltage level change of the signal feedback pin with the comparison voltage; and
  an average voltage level of the first feedback signal after passing through the filter circuit is smaller than the comparison voltage, and an average voltage level of the second feedback signal after passing through the filter circuit is greater than the comparison voltage.

13. An electronic device, comprising:
  an electronic circuit, at least comprising a central processing unit, a system chipset, a system memory, a data storage medium, and a display interface; and the central processing unit, the system memory, the data storage medium, and the display interface being arranged to be electrically coupled to the system chipset;
  an electrical connection port, comprising a plurality of signal pins electrically coupled to the system chipset;
  a controller, electrically coupled to the system chipset, and including a signal output pin and a signal feedback pin;
  a voltage dropping resistor, electrically coupled to the signal output pin of the controller; and
  a detection capacitor, having one end electrically coupled to the voltage dropping resistor of the controller;
  a feedback wire, having one end electrically coupled to a conjunction node of the voltage dropping resistor and the detection capacitor and the other end electrically coupled to the signal feedback pin; and
  a detection pin, disposed in the electrical connection port and electrically coupled to the other end of the detection capacitor;
  wherein the electronic device is arranged such that the controller initiates a detection signal from the signal output pin, the detection signal forms a first feedback signal or a second feedback signal according to a connection state of the detection pin after passing through the voltage dropping resistor, and the first feedback signal or the second feedback signal is then fed back to the signal feedback pin of the controller, and the controller initiates a system event to the system chipset when receiving the second feedback signal.

14. The electronic device as claimed in claim 13, wherein the controller is an embedded controller.

15. The electronic device as claimed in claim 13, wherein the embedded controller is a keyboard controller or a micro-control unit.

16. The electronic device as claimed in claim 13, wherein the detection signal and the first feedback signal are both continuous pulse signals, and the detection signal and the first feedback signal have the same signal cycle and duty to cycle ratio.

17. The electronic device as claimed in claim 13, wherein:
  the controller stores waveforms of the first feedback signal and the second feedback; and
  the controller compares a waveform of a signal received by the signal feedback pin with the waveforms of the first feedback signal and the second feedback signal, so as to determine whether the signal feedback pin receives the first feedback signal or the second feedback signal.

18. The electronic device as claimed in claim 13, wherein:
  a threshold voltage level and a threshold time are set in the controller, and the controller detects a voltage level change of the signal feedback pin;
  when a duration in which a voltage level of the signal feedback pin is continuously lower than the threshold voltage level exceeds the threshold time, the controller determines that a signal received by the signal feedback pin is the second feedback signal; and
  when the voltage level of the signal feedback pin is continually higher than the threshold voltage level, the controller determines that the signal received by the signal feedback pin is the first feedback signal; or when a duration in which the voltage level of the signal feedback pin is continuously lower than the threshold voltage level does not exceed the threshold time, the controller determines that the signal received by the signal feedback pin is the first feedback signal.

19. The electronic device as claimed in claim 18, wherein the controller includes a comparator for comparing the voltage level of the signal feedback pin with the threshold voltage level.

20. The electronic device as claimed in claim 18, wherein the detection signal is a continuous pulse signal, and the controller performs a voltage level comparison when an output of the detection signal is a duty portion of a signal cycle.

21. The electronic device as claimed in claim 13, further comprising a switch having one end electrically coupled to the detection pin and the other end electrically grounded, wherein the controller transmits a switching signal to turn the switch to electrically ground the detection pin when receiving the second feedback signal.

22. The electronic device as claimed in claim 13, further comprising a filter circuit electrically coupled to the feedback wire, wherein the filter circuit comprises:

a diode, having an anode connected in series to the voltage dropping resistor through the feedback wire and a cathode electrically coupled to the signal feedback pin of the controller; and a ground capacitor and a ground resistor, connected in parallel to each other, wherein one conjunction node of the ground capacitor and the ground resistor is electrically coupled to the cathode of the diode, and the other conjunction node of the ground capacitor and the ground resistor is electrically grounded.

23. The electronic device as claimed in claim 22, wherein a comparison voltage is et in the controller, and the controller determines whether the first feedback signal or the second feedback signal is received by comparing a voltage level change of the signal feedback pin with the comparison voltage; and an average voltage level of the first feedback signal after passing through the filter circuit is smaller than the comparison voltage, and an average voltage of the second feedback signal after passing through the filter circuit is greater than the comparison voltage.

* * * * *